(12) United States Patent  (10) Patent No.: US 9,039,444 B2
Hsieh  (45) Date of Patent: May 26, 2015

(54) CONNECTOR INTEGRATING DEVICE

(71) Applicant: PHIHONG TECHNOLOGY CO., LTD., Taoyuan County (TW)

(72) Inventor: Tom Hsieh, New Taipei (TW)

(73) Assignee: PHIHONG TECHNOLOGY CO., LTD., Taoyuan (TW)

( * ) Notice: Subject to any disclaimer, the term of this patent is extended or adjusted under 35 U.S.C. 154(b) by 137 days.

(21) Appl. No.: 13/958,560

(22) Filed: Aug. 4, 2013

(65) Prior Publication Data

US 2015/0024625 A1    Jan. 22, 2015

(30) Foreign Application Priority Data

Jul. 16, 2013    (TW) .............................. 102125453 A

(51) Int. Cl.
    *H01R 33/90*    (2006.01)
    *H01R 27/00*    (2006.01)
    *H01R 35/04*    (2006.01)

(52) U.S. Cl.
    CPC ................ *H01R 33/90* (2013.01); *H01R 27/00* (2013.01); *H01R 35/04* (2013.01)

(58) Field of Classification Search
    CPC ......... H01R 35/04; H01R 27/00; H01R 33/90
    See application file for complete search history.

(56) References Cited

U.S. PATENT DOCUMENTS

| | | | | |
|---|---|---|---|---|
| 6,312,271 | B1* | 11/2001 | Tseng | ............................ 439/131 |
| 7,012,403 | B2* | 3/2006 | Hwang | ......................... 320/107 |
| 7,374,433 | B2* | 5/2008 | Wu | ............................... 439/76.1 |
| 7,549,877 | B1* | 6/2009 | Vista et al. | ..................... 439/172 |
| 8,075,318 | B2* | 12/2011 | Zhao et al. | ........................ 439/13 |
| 2002/0151199 | A1* | 10/2002 | Yao | ................................ 439/131 |
| 2002/0173183 | A1* | 11/2002 | Segawa et al. | ................ 439/131 |
| 2005/0282417 | A1* | 12/2005 | Tsao | ............................... 439/131 |
| 2008/0254684 | A1* | 10/2008 | Tracy et al. | ............... 439/620.21 |
| 2009/0063733 | A1* | 3/2009 | Huang et al. | ..................... 710/38 |
| 2009/0280665 | A1* | 11/2009 | Yang | ................................ 439/173 |
| 2012/0147574 | A1* | 6/2012 | Yang et al. | ..................... 361/755 |
| 2015/0024625 | A1* | 1/2015 | Hsieh | ......................... 439/540.1 |

* cited by examiner

*Primary Examiner* — James Harvey
(74) *Attorney, Agent, or Firm* — Chih Feng Yeh; Huntington IP Consulting Co., Ltd.

(57) ABSTRACT

A connector integrating device includes a housing which includes a through hole and two vertical walls, the two vertical walls being formed on the inner surface of the housing and adjacent to the through hole, two notches being respectively formed on ends of the two vertical walls; and a connector integrating structure including a plurality of different types of connectors and two cylindrical projective portions, each of the plurality of connectors being respectively formed in different orientations of the longitudinal plane of the connector integrating structure, the two cylindrical projective portions being respectively formed on the two opposite surfaces of the connector integrating structure, the two cylindrical projective portions being respectively disposed partially in the notches on the two vertical walls and being able to respectively lean against the inner surfaces of the notches and rotate about the central axes of the two cylindrical projective portions.

15 Claims, 11 Drawing Sheets

CONNECTOR INTEGRATING DEVICE

CROSS REFERENCE TO RELATED APPLICATIONS

This application claims the benefit of TAIWAN patent application no. 102125453, filed Jul. 16, 2013, which are herein incorporated by reference in its integrity.

TECHNICAL FIELD

The present invention relates to connectors, and more particularly to a connector integrating device.

BACKGROUND OF THE RELATED ART

Mobile devices have been developed increasingly from the cell phone in the early stage to smart phones with various sizes, tablet PCs with different sizes, navigators, personal digital assistants (PDAs), netbooks, mobile TVs, etc. Recently, every person may have more than one types of mobile devices or smart mobile devices.

Typically, the charging interface specification of the mobile device or smart mobile device is not identical. The power consumption of the mobile devices or smart mobile devices from the batteries is very fast because the task loading is heavy than ever. The duration of the battery lasts less than one half day for the mobile devices or the smart mobile devices. The power charging is anxious to replenish the energy for operating the devices. Therefore, mobile power has been developed nowadays for the users to carry, so as to charge the mobile devices or the smart mobile devices for urgent use. There are various types of power of the mobile power to meet different demands of the user. Generally, if a notebook or a netbook is to be charged, a mobile power with higher power is needed to support continuous usage of the notebook or the netbook. If a small type of mobile device, for instance smart phone or tablet PC, is to be charged, a mobile power with lower power may be utilized to maintain the usage of a period of time. The existing mobile power usually provides a number of different types of connectors by default in order for the users to replace the connectors, so as to charge different kinds of mobile devices or smart mobile devices. If the user needs more specific types of connectors, the user should buy the specific type of connectors.

However, the traditional connectors are replaced into other types of connectors by plugging and unplugging. In other words, if the user carries multiple mobile devices with different types of connectors, the user has to carry different types of connectors or connecting cables at the same time to charge the mobile devices or transmit data. Thus, it is quite inconvenient to the user.

Therefore, there is still a need for a technical solution which can solve the problem of the traditional connectors.

SUMMARY

To overcome the problem of the traditional connectors, the present invention provides a connector integrating device.

In one aspect, the present invention discloses a connector integrating device, including a housing including a through hole and two vertical walls, the through hole being formed on an upper surface of the housing, the two vertical walls being formed on an inner surface of the housing and adjacent to the through hole, two notches being respectively formed on ends of the two vertical walls, the ends being far from the inner surface of the housing; and a connector integrating structure including a plurality of different types of connectors and two cylindrical projective portions, each of the plurality of connectors being respectively formed at different orientations on a longitudinal plane of the connector integrating structure, the two cylindrical projective portions being respectively formed on two opposite surfaces of the connector integrating structure, central axes of the two cylindrical projective portions passing through a geometric center of the connector integrating structure and being vertical to the longitudinal plane, shapes of the two cylindrical projective portions matching shapes of the notches on the two vertical walls, the two cylindrical projective portions being respectively disposed partially in the notches on the two vertical walls and being able to respectively lean against inner surfaces of the notches on the two vertical walls and rotate about the central axes of the two cylindrical projective portions, so as to render each of the plurality of connectors to pass through the through hole and be rotated out of the housing in order, to change the different types of connectors.

One advantage of the present invention is that the present invention can save space occupied by the different types of connectors.

Another advantage of the present invention is that when the user utilizes the mobile devices or the smart mobile devices with different types of connectors, he/she needs not to carry various different types of connectors or connecting cables and only needs to carry one connector integrating device of the present invention to charge the mobile devices or the smart mobile devices with different types of connectors or transmit data signals from/to the mobile devices or the smart mobile devices with different types of connectors, so as to greatly enhance the convenience for the user.

These and other advantages will become apparent from the following description of preferred embodiments taken together with the accompanying drawings and the appended claims.

BRIEF DESCRIPTION OF THE DRAWINGS

The present invention may be understood by some preferred embodiments and detailed descriptions in the specification and the attached drawings below.

DETAILED DESCRIPTION

The present invention will now be described with the preferred embodiments and aspects and these descriptions interpret structure and procedures of the present invention only for illustrating but not for limiting the Claims of the present invention. Therefore, except the preferred embodiments in the specification, the present invention may also be widely used in other embodiments.

Figure 1:
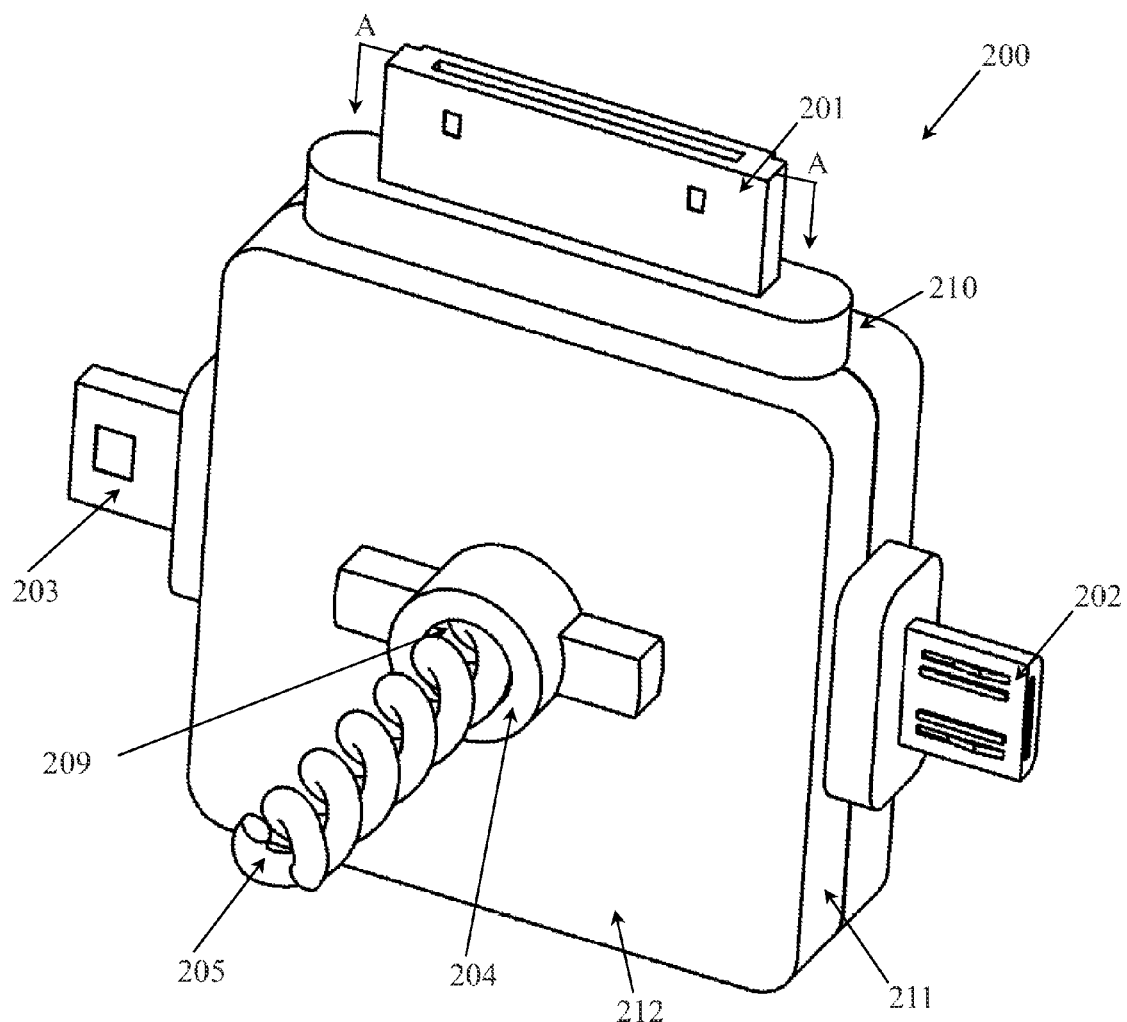
FIG. 1 illustrates a diagram of a connector integrating structure in accordance with one embodiment of the present invention.
Figure 2:
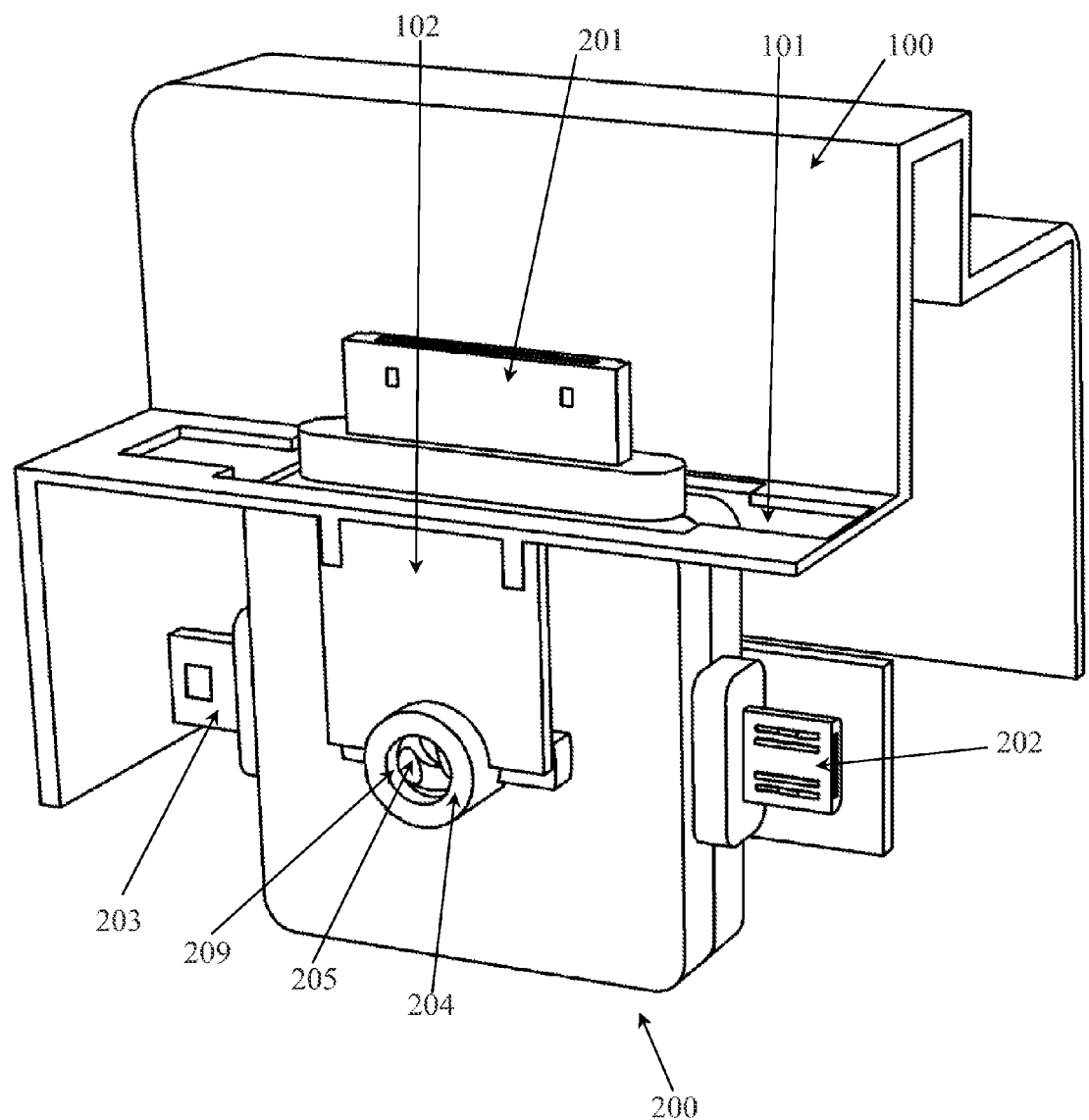
FIG. 2 illustrates a diagram of part of a connector integrating device in accordance with one embodiment of the present invention.

The present invention discloses a connector integrating device. As shown in FIGS. 1, 2 and 9, the connector integrating device 10 of the present invention includes a housing 100 and connector integrating structure(s) 200. With reference to FIGS. 2, 5A, 8 and 9, the housing 100 is utilized to accommodate the connector integrating structure(s) 200, fixing rod(s) 300 and related circuit board(s) (not shown). The housing 100 includes elongated through hole(s) 101 and through hole(s) 106 formed on the upper surface of the housing 100 respectively to enable different connectors on the connector integrating structure(s) 200 and push button(s) 302 on the fixing rod(s) 300 to pass through the through hole(s) 101 and the through hole(s) 106 respectively and be exposed from the housing 100.

As shown in FIG. 1, the connector integrating structure(s) 200 includes different types of connectors formed on different surfaces thereof. For example, a first connector 201 is formed on the upper surface 210 of the connector integrating structure 200, and a second connector 202 is formed on the right side surface 211 of the connector integrating structure 200 while a third connector 203 is formed on the left side surface (not shown) of the connector integrating structure 200. The first connector 201, the second connector 202 and the third connector 203 are coupled to one another. FIG. 1 is shown for illustrating the present invention, not for limiting the present invention. Therefore, the number of the different types of connectors is not limited to three as shown in FIG. 1, and may be two, four, five, six, seven, eight, nine, ten, etc or any other numbers. The shape of the cross-section of the connector integrating structure 200 taken along the direction A-A (i.e. longitudinal direction) is not limited to quadrangle, and may be triangle, pentagon, hexagon, heptagon, octagon, nonagon, decagon, etc or any other polygons. For instance, not to limit the present invention, as shown in FIG. 1, the first connector 201 may be 30-pin connector manufactured by Apple Computer, Inc., and the second connector 202 may be micro USB(universal serial bus) while the third connector 203 may be 8-pin connector manufactured by Apple Computer, Inc.

The examples of the connectors are described for illustrating the present invention, not for limiting the present invention. Therefore, the first connector 201, the second connector 202 and the third connector 203 may respectively be other different types of connectors, such as mini USB, USB, etc. In one embodiment, mini USB may be Mini-A, Mini-B or Mini-AB. Micro USB may be Micro-A, Micro-B or Micro-AB. USB may be Type A USB or Type B USB. As shown in FIGS. 1 and 9, the first connector 201, the second connector 202 and the third connector 203 are coupled to one another and are further coupled to wire(s) 205. The wire(s) 205 may be further coupled with a power input end or data signal input end 105 in the housing 100 to input power or data signals to the different types of connectors. The power input end or data signal input end 105 may be further coupled to a power cable or a data signal transmission cable to receive power or data signals. Referring to FIG. 1, a cylindrical projective portion 204 is formed on the front surface 212 of the connector integrating device 200. The cylindrical projective portion 204 includes a hole 209 formed therein to enable the wire(s) 205 to pass therethrough. As shown in FIGS. 1 and 2, the different types of connectors such as the first connector 201, the second connector 202 and the third connector 203 are located in the same longitudinal plane. When the connector integrating structure 200 rotates about the cylindrical projective portion 204, the different types of connectors may be exposed from the through hole 101 in the housing 100 in order. The central axis of the cylindrical projective portion 204 passes through the geometric center of the connector integrating structure 200 and is vertical to the longitudinal plane in which the first connector 201, the second connector 202 and the third connector 203 are located.

Figure 8:
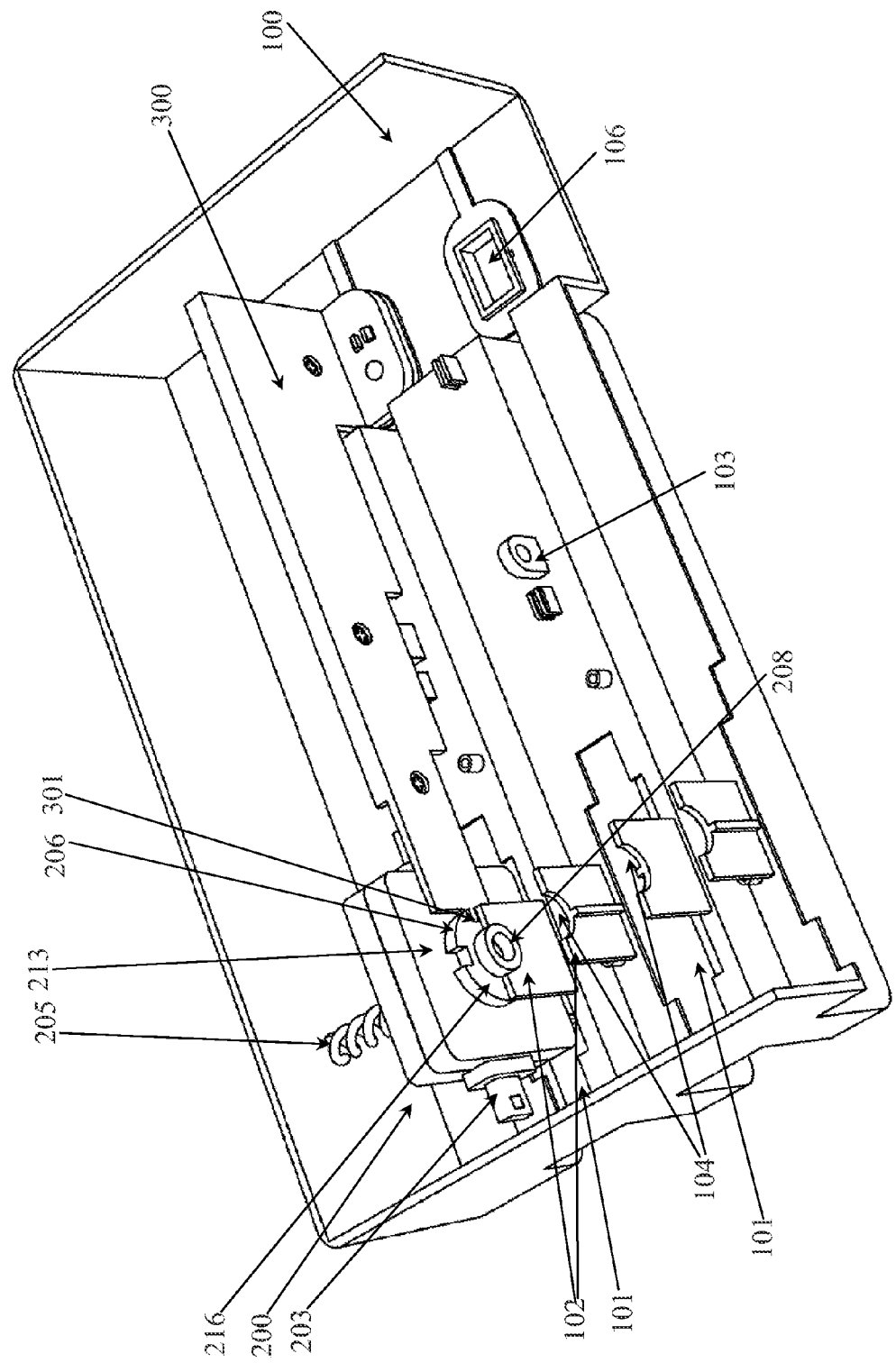
FIG. 8 illustrates a diagram of part of the connector integrating device in accordance with one embodiment of the present invention.
Figure 9:
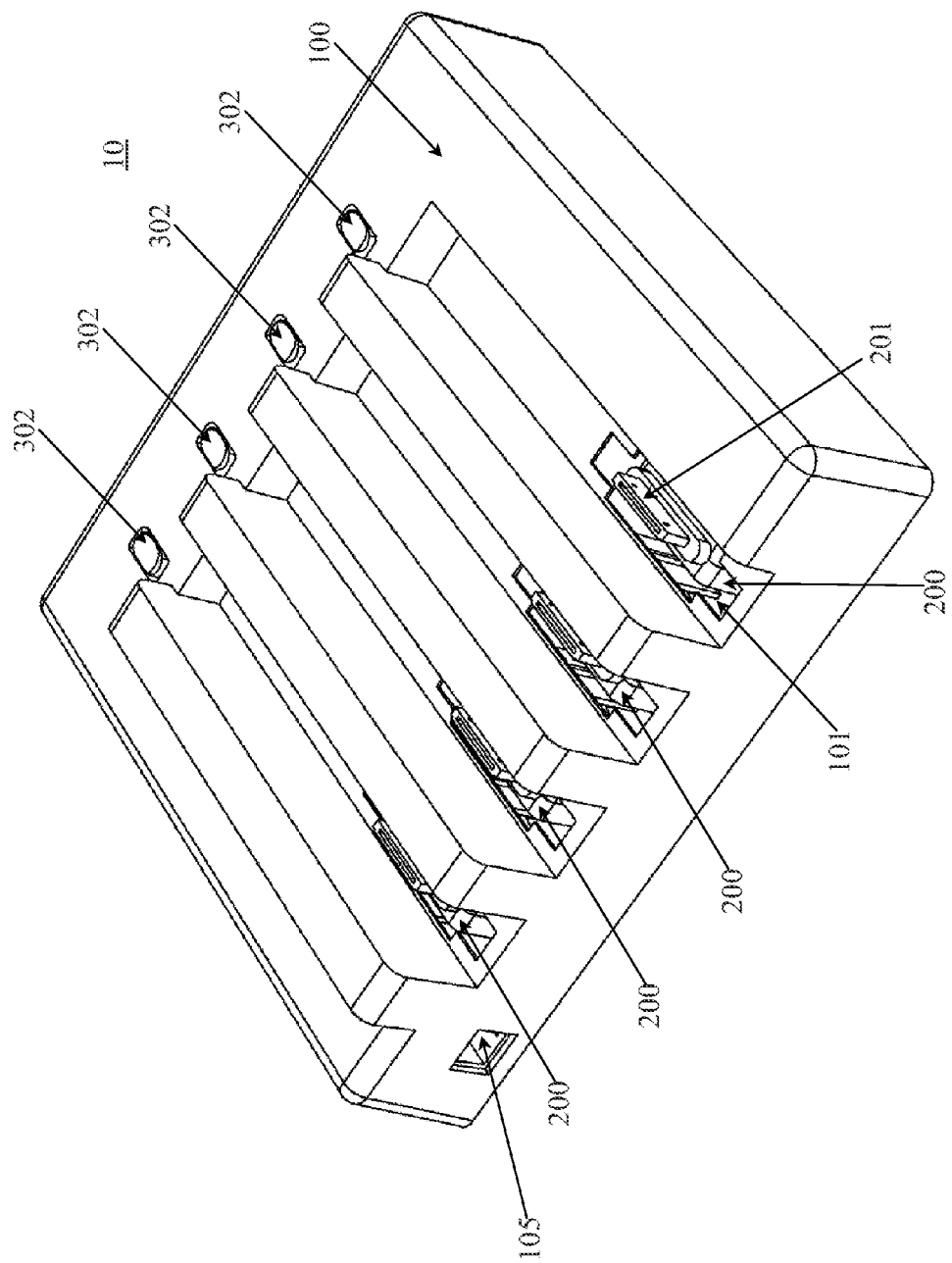
FIG. 9 illustrates a diagram of the connector integrating device in accordance with one embodiment of the present invention.

With reference to FIGS. 2 and 8, the housing 100 of the connector integrating device of the present invention includes at least two vertical walls 102 which are formed on the inner surface of the housing 100 and are parallel to each other and adjacent to the through hole 101. As shown in FIG. 8, one end of the vertical wall 102 which is far from the inner surface of the housing 100 includes a notch 104 to receive the cylindrical projective portion 204 of the connector integrating structure 200. Referring to FIG. 2, the cylindrical projective portion 204 of the connector integrating structure 200 is partially disposed in the notch 104, and is able to lean against the inner surface of the notch 104 because the shape of the cylindrical projective portion 204 matches the shape of the notch 104, such that the connector integrating structure 200 can rotate about the cylindrical projective portion 204 to render the different types of connectors to be exposed from the through hole 101 of the housing 100, so as to charge the mobile device or the smart mobile device or transmit data signals to/from the mobile device or the smart mobile device.

Figure 3:
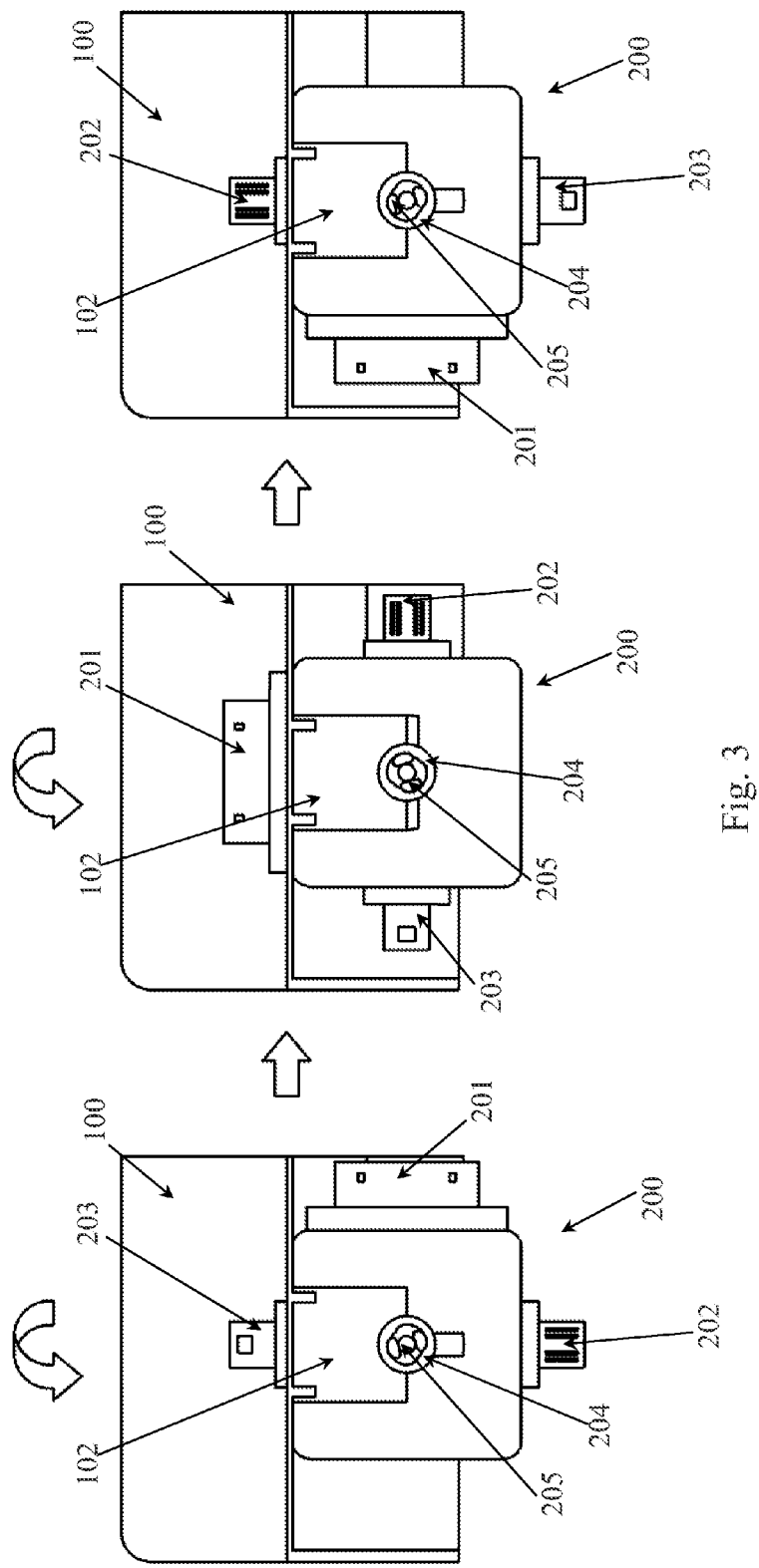
FIG. 3 illustrates a diagram showing the rotation of the connector integrating structure in the connector integrating device in accordance with one embodiment of the present invention.
Figure 4:
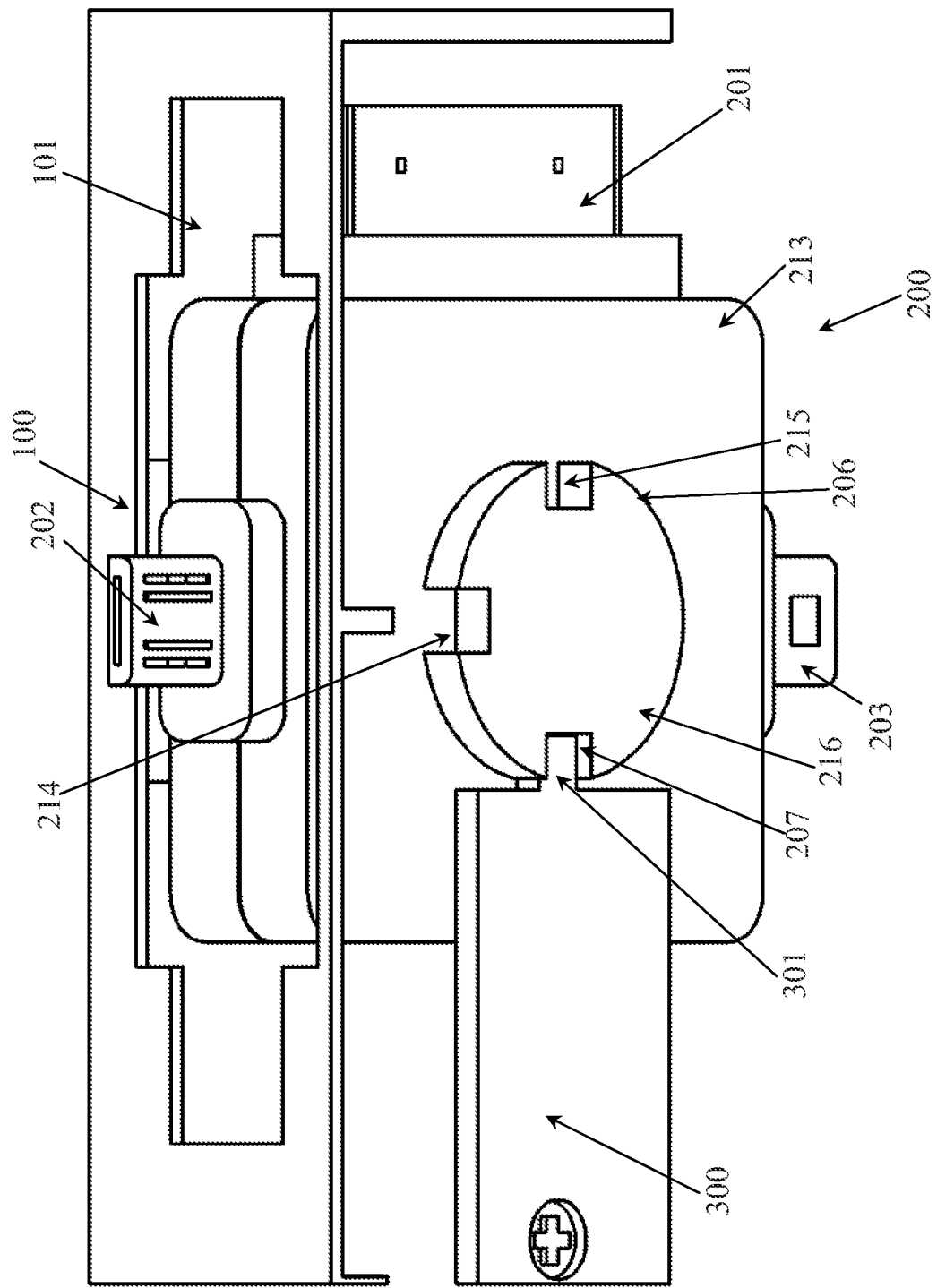
FIG. 4 illustrates a diagram of part of the connector integrating device in accordance with one embodiment of the present invention.

Referring to FIG. 3, the connector integrating structure 200 can rotate about the cylindrical projective portion 204 to respectively render the third connector 203, the first connector 201 and the second connector 202 to be exposed from the housing 100 in order. As shown in FIGS. 4 and 8, the connector integrating structure 200 further includes a rear surface 213 which is opposite to the front surface 212. A disc projective portion 206 is formed on the rear surface 213. The disc projective portion 206 includes a plurality of notches, for instance three notches, such as a first notch 214, a second notch 207 and a third notch 215, which are formed on the edge of the disc projective portion 206 respectively. The number of the notches on the edge of the disc projective portion 206 corresponds to the number of the connectors. For example, if there are three connectors formed on the connector integrating structure 200, there are three notches formed on the edge of the disc projective portion 206. If there are four connectors formed on the connector integrating structure 200, there are four notches formed on the edge of the disc projective portion 206, and so forth. An angle of 90 degrees is formed between the central axis of every notch and the projective direction of the corresponding connector. For instance, in the present embodiment, an angle of 90 degrees is formed between the central axis of the first notch 214 and the projective direction of the first connector 201, and an angle of 90 degrees is formed between the central axis of the second notch 207 and the projective direction of the second connector 202 while an angle of 90 degrees is formed between the central axis of the third notch 215 and the projective direction of the third connector 203. If the shape of the cross-section of the connector integrating structure 200 taken along the direction A-A is not quadrangle, the angle formed between the central axis of every notch and the projective direction of the corresponding connector is still 90 degrees.

Figure 5A:
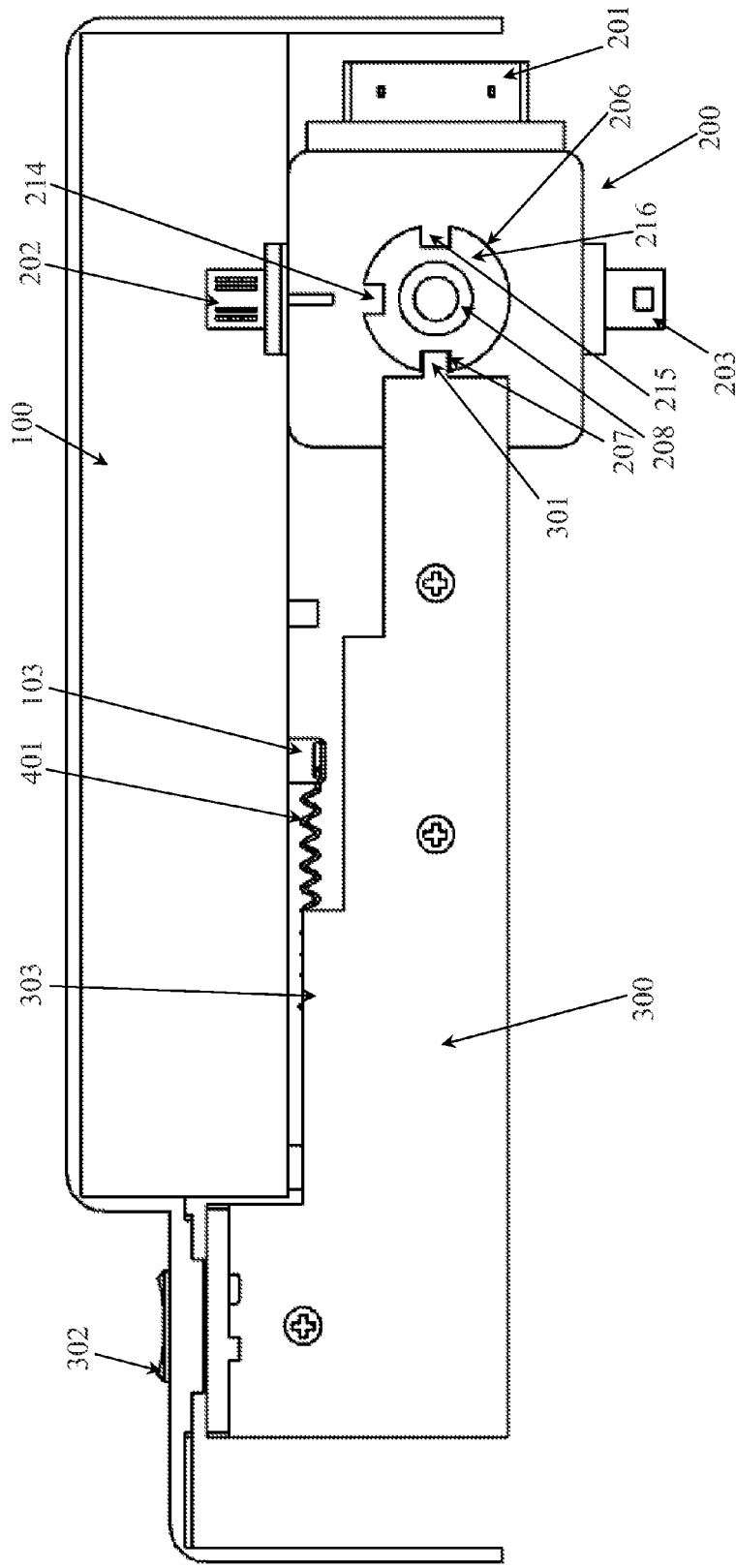
FIGS. 5A, 5B, 6A and 6B illustrate a diagram showing the movement of the fixing rod in the connector integrating device in accordance with one embodiment of the present invention.
Figure 6A:
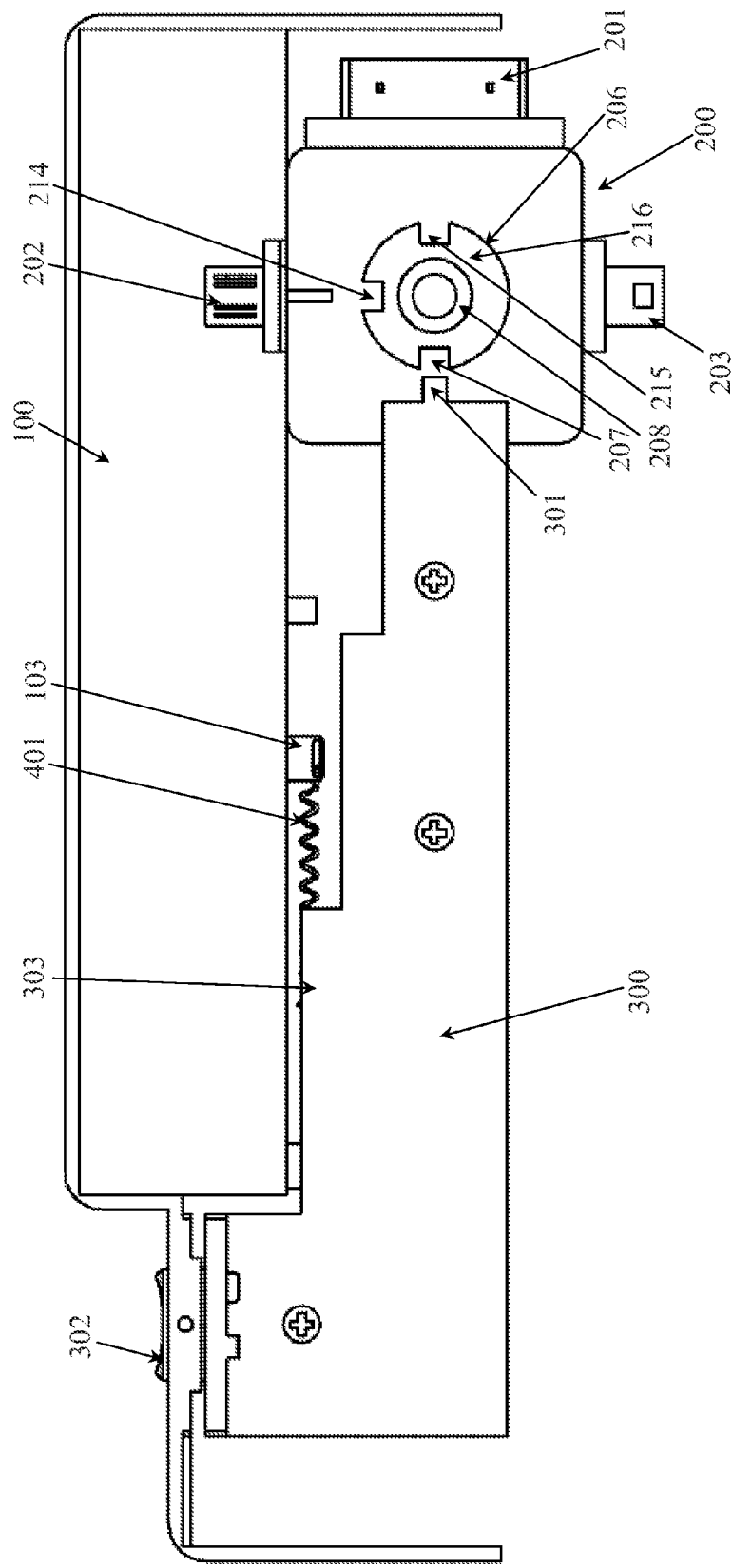

As shown in FIG. 8, a cylindrical projective portion 208 is formed on the front surface 216 of the disc projective portion 206 and may be partially disposed in the notch 104. The cylindrical projective portion 208 is able to lean against the inner surface of the notch 104 because the shape of the cylindrical projective portion 208 matches the shape of the notch 104. The cylindrical projective portion 208 and the cylindrical projective portion 204 are opposite to each other and are formed on two opposite surfaces respectively. The central axis of the cylindrical projective portion 208 and the central axis of the cylindrical projective portion 204 are located on the same axis, and the sizes of the cylindrical projective portion 208 and the cylindrical projective portion 204 are the same with each other to form a rotation central axis, such that the connector integrating structure 200 can rotate about the rotation central axis. With reference to FIGS. 4, 5A and 6A, the connector integrating device 10 of the present invention further includes a fixing rod 300 to fix the position of the connector integrating structure 200. One end of the fixing rod 300 includes a projective portion 301, the shape of which matches the shapes of a plurality of notches, for instance the first notch 214, the second notch 207 and the third notch 215, on the edge of the disc projective portion 206, so as to insert the projective portion 301 into one of the plurality of notches, such as the first notch 214, the second notch 207 or the third notch 215, and lock one of the plurality of notches, such as the first notch 214, the second notch 207 or the third notch 215, to fix the position of the connector integrating structure 200.

Figure 5B:
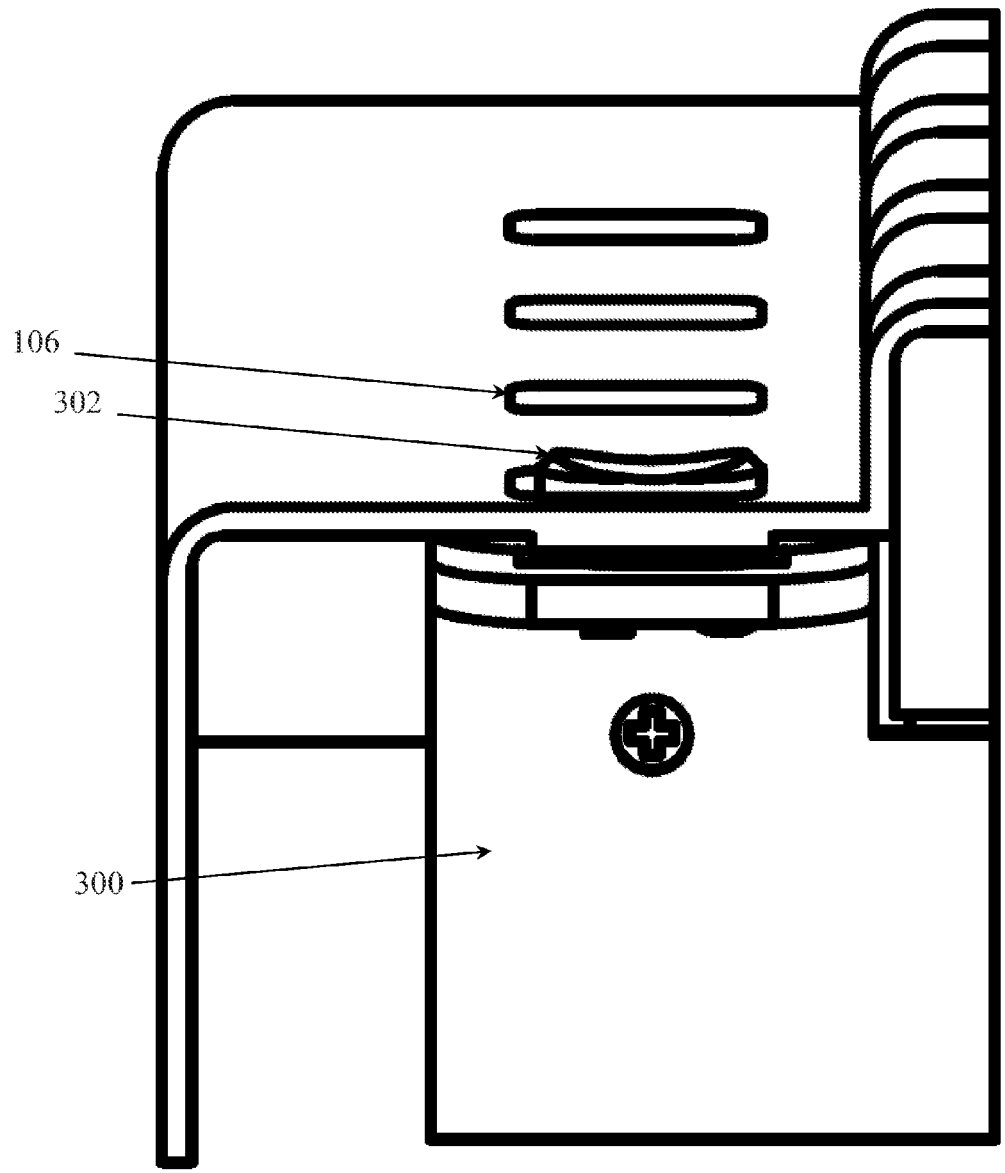
Figure 6B:
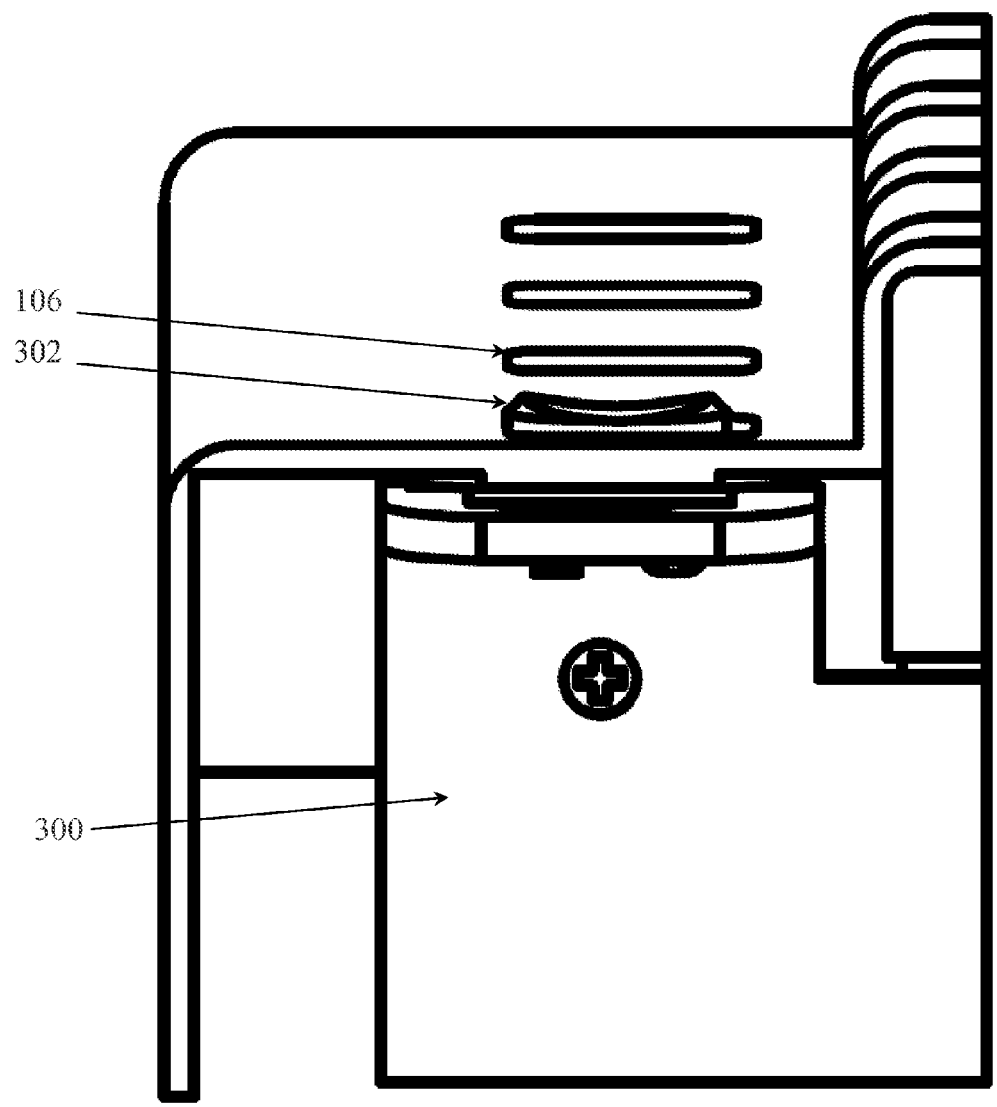

Referring to FIGS. 5A, 5B and 8, the fixing rod 300 further includes a push button 302, which is formed on the other end of the fixing rod 300 and passes through the through hole 106 of the housing 100 to be exposed from the through hole 106, in order for the users to push and move the fixing rod 300. The fixing rod 300 may move between a first position(also referred to as a locking position) and a second position(also referred to as a release position). As shown in FIGS. 5A and 5B, when the fixing rod 300 is in the first position, the projective portion 301 is inserted into one of the plurality of notches such as the second notch 207 to fix the position of the second connector 202, and the push button 302 is in a position in which the push button 302 is close to the connector integrating structure 200. As shown in FIGS. 6A and 6B, when the fixing rod 300 is in the second position, the projective portion 301 is far from one of the plurality of notches such as the second notch 207, and the push button 302 is in a position in which the push button 302 is far from the connector integrating structure 200. At this time, the connector integrating structure 200 can be rotated to render the connectors other than the second connector 202, for example the first connector 201, to be rotated out of the through hole 101 and be exposed from the through hole 101 because the connector integrating structure 200 is not locked by the projective portion 301 of the fixing rod 300. Then, the push button 302 is moved back to the position in which the push button 302 is close to the connector integrating structure 200, and the fixing rod 300 is moved back to the first position to render the projective portion 301 to be inserted into the first notch 214, so as to fix the position of the first connector 201. Similarly, if the third connector 203 is rotated out of the through hole 101 and is exposed from the through hole 101, the projective portion 301 will be inserted into the third notch 215 to fix the position of the third connector 203.

Figure 7:
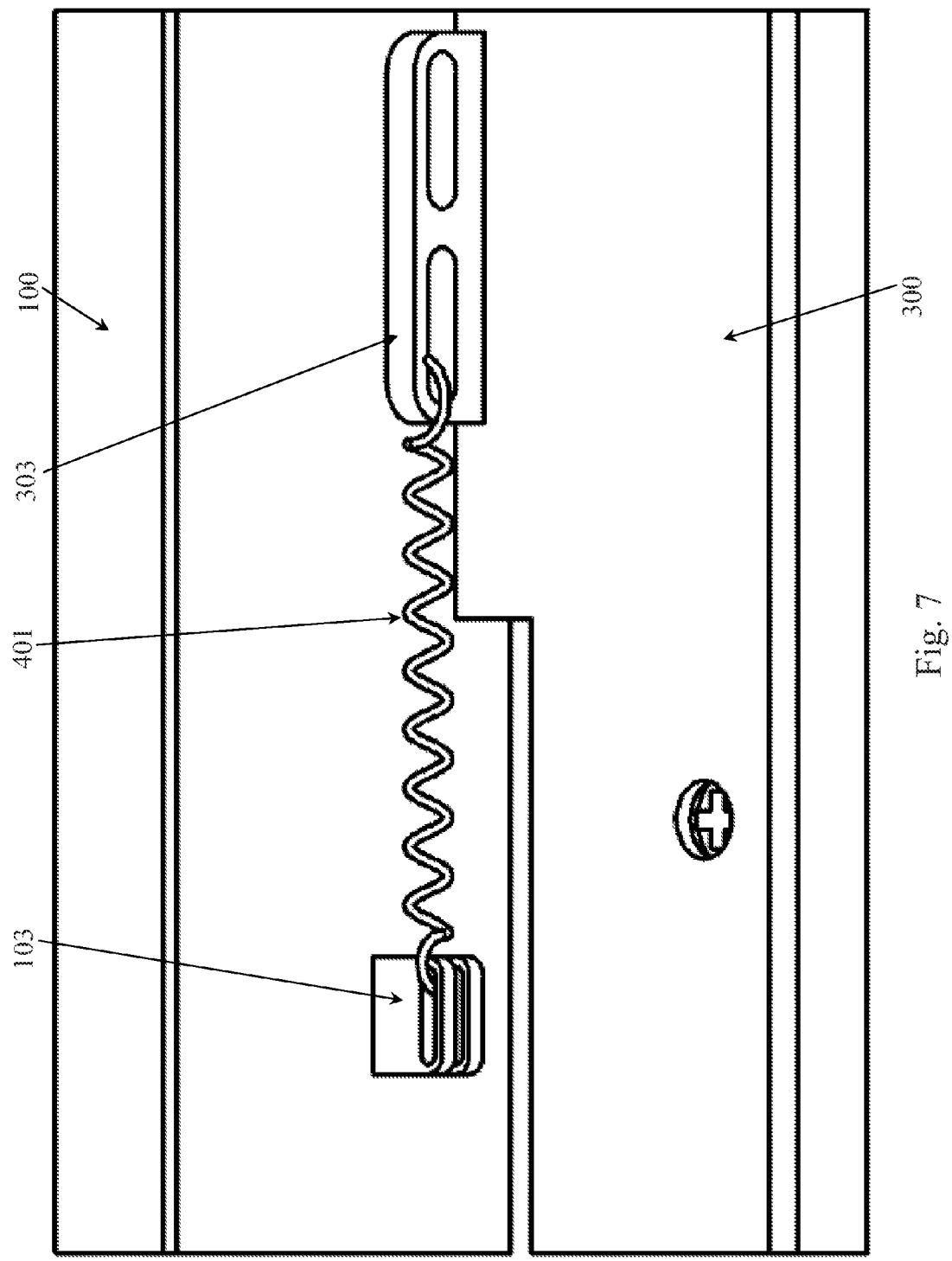
FIG. 7 illustrates a diagram of part of the connector integrating device in accordance with one embodiment of the present invention.

With reference to FIGS. 5A, 6A and 7, the housing 100 further includes fixing block(s) 103 having a hole and the fixing rod 300 further includes fixing block(s) 303 having a hole. The fixing block(s) 103 is formed on the inner surface of the housing 100 while the fixing block(s) 303 is formed on the upper surface of the fixing rod 300 and is opposite to the fixing block 103. As shown in FIGS. 5A, 6A and 7, the connector integrating device 10 of the present invention may further include spring(s) 401. One end of the spring(s) 401 is connected with the fixing block 103 while the other end of the spring(s) 401 is connected with the fixing block 303. When the fixing rod 300 is in the second position, the spring(s) 401 is stretched and a restoring force is provided to render the fixing rod 300 to move from the second position to the first position. When the user desires to change different types of connectors, he/she can push the push button 302 to render the fixing rod 300 to move from the first position(i.e. locking position) to the second position(release position) and can push the exposed connector to render the exposed connector to be rotated into the housing 100 and render the other types of connectors to be rotated out of the housing 100, in order for the user to utilize the other types of connectors to charge or transmit data signals. Referring to FIG. 9, in one embodiment, the connector integrating device 10 of the present invention may include more than one connector integrating structures 200 and more than one fixing rods (not shown). In the embodiment shown in FIG. 9, four connector integrating structures 200 and four fixing rods (not shown) are included. FIG. 9 is shown to illustrate one embodiment of the present invention, not to limit the present invention. Therefore, the connector integrating device 10 of the present invention may include one, two, three, five or any other number of connector integrating structures 200, and may include one, two, three, five or any other number of fixing rods (not shown). There may be one, two, three, four, five or any number of the corresponding push buttons 302.

Therefore, the connector integrating device provided by the present invention can integrate different types of connectors into one device by disposing different types of connectors at different orientations on the same longitudinal plane of one structure, rotating the different types of connectors about a rotation central axis into/out of the housing and fixing the position of the structure with the fixing rod, such that the present invention can save space occupied by the different types of connectors. Thus, when the user utilizes the mobile devices or the smart mobile devices with different types of connectors, he/she needs not to carry various different types of connectors or connecting cables and only needs to carry one connector integrating device of the present invention to charge the mobile devices or the smart mobile devices with different types of connectors or transmit data signals from/to the mobile devices or the smart mobile devices with different types of connectors, so as to greatly enhance the convenience for the user.

The foregoing description is a preferred embodiment of the present invention. It should be appreciated that this embodiment is described for purposes of illustration only, not for limiting, and that numerous alterations and modifications may be practiced by those skilled in the art without departing from the spirit and scope of the present invention. It is intended that all such modifications and alterations are included insofar as they come within the scope of the present invention as claimed or the equivalents thereof.

What is claimed is:

1. A connector integrating device, comprising:
    a housing including a through hole and two vertical walls, an upper surface of said housing having said through hole formed thereon, said two vertical walls being formed on an inner surface of said housing and adjacent to said through hole, two notches being respectively formed on ends of said two vertical walls, said ends being far from said inner surface of said housing; and a connector integrating structure including a plurality of different types of connectors and two cylindrical projective portions, each of said plurality of connectors being respectively formed at different orientations on a longitudinal plane of said connector integrating structure, said two cylindrical projective portions being respectively formed on two opposite surfaces of said connector integrating structure, central axes of said two cylindrical projective portions passing through a geometric center of said connector integrating structure and being vertical to said longitudinal plane, shapes of said two cylindrical projective portions matching shapes of said notches on said two vertical walls, said two cylindrical projective portions being respectively disposed partially in said notches on said two vertical walls and being able to respectively lean against inner surfaces of said notches on said two vertical walls and rotate about said central axes of said two cylindrical projective portions, so as to render each of said plurality of connectors to pass through said through hole and be rotated out of said housing in order, to change said different types of connectors.

2. A device of claim 1, further comprising a fixing rod to fix a position of said connector integrating structure.

3. A device of claim 2, wherein one end of said fixing rod includes a projective portion and said two cylindrical projective portions include a first cylindrical projective portion and a second cylindrical projective portion, said first cylindrical projective portion being formed on a front surface of said connector integrating structure, said second cylindrical projective portion being formed on a rear surface of said connector integrating structure.

4. A device of claim 3, wherein said connector integrating structure further comprises a disc projective portion formed between said second cylindrical projective portion and said rear surface.

5. A device of claim 4, wherein said disc projective portion includes a plurality of notches formed on an edge of said disc projective portion.

6. A device of claim 5, wherein when said fixing rod is in a first position, said projective portion is inserted into one of said plurality of notches to fix said position of said connector integrating structure.

7. A device of claim 6, wherein when said fixing rod is in a second position, said projective portion is far from one of said plurality of notches and said connector integrating structure is able to rotate about said central axes of said two cylindrical projective portions, so as to render said different types of connectors to be exposed from said housing.

8. A device of claim 7, wherein said fixing rod further includes a push button formed on the other end of said fixing rod and said housing further includes a second through hole formed on said upper surface of said housing.

9. A device of claim 8, wherein said push button passes through said second through hole to be exposed from said housing in order for a user to push said push button and render said fixing rod to move from said first position to said second position.

10. A device of claim 7, further comprising a spring, one end of said spring being connected with said fixing rod, the other end of said spring being connected with said housing to provide a restoring force to render said fixing rod to move from said second position to said first position.

11. A device of claim 5, wherein said plurality of notches include a first notch, a second notch and a third notch and said plurality of connectors include a first connector, a second connector and a third connector.

12. A device of claim 11, wherein a right angle is formed between a central axis of said first notch and a projective direction of said first connector, a right angle is formed between a central axis of said second notch and a projective direction of said second connector, and a right angle is formed between a central axis of said third notch and a projective direction of said third connector.

13. A device of claim 11, wherein when said first connector is exposed from said housing, said projective portion is inserted into said first notch; when said second connector is exposed from said housing, said projective portion is inserted into said second notch; when said third connector is exposed from said housing, said projective portion is inserted into said third notch.

14. A device of claim 1, wherein a shape of a longitudinal cross-section of said connector integrating structure is polygon.

15. A device of claim 14, wherein said polygon includes quadrangle.

* * * * *